C. T. ELLISTON.
Rotary Plows.
No. 142,094. Patented August 26, 1873.
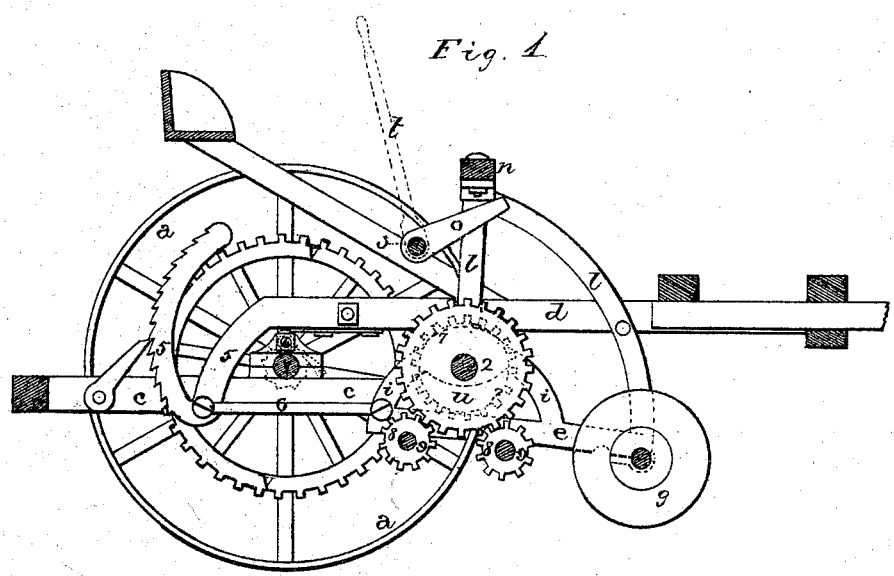
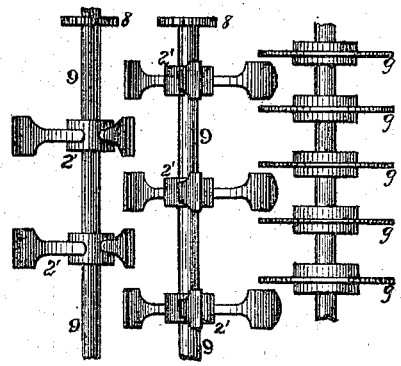

UNITED STATES PATENT OFFICE.

CHARLES T. ELLISTON, OF CLINTON, MISSOURI.

IMPROVEMENT IN ROTARY PLOWS.

Specification forming part of Letters Patent No. 142,094, dated August 26, 1873; application filed June 9, 1873.

*To all whom it may concern:*

Be it known that I, CHARLES T. ELLISTON, of Clinton, county of Henry and State of Missouri, have invented certain new and useful Improvements in Rotary Plows, of which the following is a specification:

The nature of my invention relates to an improvement in rotary plows; and it consists in the arrangement and combination of parts, which will be more fully set forth hereafter, whereby a simple and efficient plow or pulverizer is produced which will more thoroughly break and reduce the soil by going over it once than can be done by both plowing and harrowing in the usual manner.

Figure 1 is a vertical section of my invention, the frame for holding the colters and picks being raised up and from the ground. Fig. 2 is a plan view of the picks and colters.

$a$ represents the driving-wheels, secured to the shaft 1 and provided with spring-ratchets, as shown by dotted lines, in the usual manner, which allow the wheels to turn freely upon the shaft while going backward, but which cause the shaft to revolve and operate the picks in going forward. Suspended from the shaft 1 is the frame $c$, open at its front end, and having the frame $e$ carrying the picks and colters secured to it by means of the shaft 2. This frame $e$ consists of the horizontal part, having the colters $g$ pivoted upon its front end, the raised arms $i$, through which the shaft passes, and the two levers $l$, one extending on up from the arms $i$, and the other reaching backward from the front end, and having the cross-bar $n$ secured upon their top. By means of a shaft, 3, pivoted upon the beams, for supporting the driver's seat, having an arm or lever, $o$, upon each side of the frame, which catch under a projection extending outward from the inner side of the levers $l$, and an operating-lever, $t$, the frame $e$ can be raised and lowered, so as to lower the picks and colters to the earth for operation or raise them up for transportation from place to place. This construction and mode of operation of the frame $e$ adapt the same for ready adjustment of the two sets of picks and the set of colters parallel to the surface upon which they are to operate, so that they can all work upon the same plane. The frame $d$, upon which the driver's seat is supported, and to which the tongue is secured, is pivoted at the point 4 to the frame $c$, and has a ratchet-bar, 5, extending backward and upward from its rear end, by means of which the depth at which the picks are to cut is regulated. The ratchet-bars 5 have a connecting-rod, 6, extending forward and secured to the rear ends of the frame $e$, so as to support the frame and give it the proper rigidity. Secured to the shaft 1, between the wheel and the frames, is a gear-wheel, $v$, which meshes with a cog, 7, on the end of the shaft 2. To this shaft is secured a driving-wheel, $u$, which operates the two pinions 8 on the shafts 9, to which the picks $2'$ are secured. These picks consists of three or more curved sharpened arms, which are secured to the shafts by means of collars, and are arranged relatively to each other, just in rear of the colters, and in advance of the driving-wheels $a$, and made to revolve in the same direction as the wheels. The colters also act as cleaners to the picks, which should be so shaped as to discharge the loosened earth after about a quarter's revolution.

A machine constructed as thus described, passing once over the earth will pulverize it better than can be done by both plowing and harrowing in the usual manner.

Having thus described my invention, what I claim as new, and desire to secure by Letters Patent, is—

1. The double set of picks, having a forced rotation, arranged relatively to each other in the rear of the colters and in advance of the driving-wheels, substantially as shown and described.

2. The combination of the frame $e$ $l$, pivoted upon the geared shaft 2, with the pivoted frame $c$, the connecting-rods 6, and a suitable lever for raising and lowering the picks and colters, substantially as specified.

3. The combination of the frame $d$, having the ratchet-bars secured to its rear end and pivoted frame $c$, with pivoted frame $e$ $l$, connecting-rods, and lever for raising and lowering the picks and colters, substantially as shown.

In testimony that I claim the foregoing as my invention I hereunto affix my signature this 9th day of June, 1873.

C. T. ELLISTON.

Witnesses:
 Z. T. WILLIAMS,
 W. K. DUHAMEL.